Dec. 30, 1924.

G. H. YOUNG 1,520,792

RESILIENT RIM

Filed June 19, 1922

Inventor:
George H. Young.
By Fisher & Sagaard
his Attorneys

Patented Dec. 30, 1924.

1,520,792

UNITED STATES PATENT OFFICE.

GEORGE H. YOUNG, OF ST. PAUL, MINNESOTA.

RESILIENT RIM.

Application filed June 19, 1922. Serial No. 569,500.

*To all whom it may concern:*

Be it known that I, GEORGE H. YOUNG, a citizen of the United States, residing at St. Paul, in the county of Ramsey and State of Minnesota, have invented a new and useful Improvement in Resilient Rims, of which the following is a specification.

My invention relates to resilient rims and has for its object to provide a rim having a series of spring members interposed within the same for cushioning the tire mounted on the said rim, to the wheel proper.

Another object is to provide a pair of bumpers within the rim which serve to terminate the movement of the two elements of the rim, when the same have been moved their maximum distance.

A still further object is to provide a plurality of spirally arranged spring members connected between the outer and inner rim member, said springs being arranged in crossed relation to one another on opposite sides of the rim proper, so as to cushion the wheel regardless of the position of the parts of the same.

A still further object is to construct the rim members in sections so that the parts may be readily assembled or dismounted.

The principal objects and advantages of my invention will be found in connection with the detailed description thereof and are particularly pointed out in the claims.

In the drawings illustrating my invention in one form:

Figure 2:
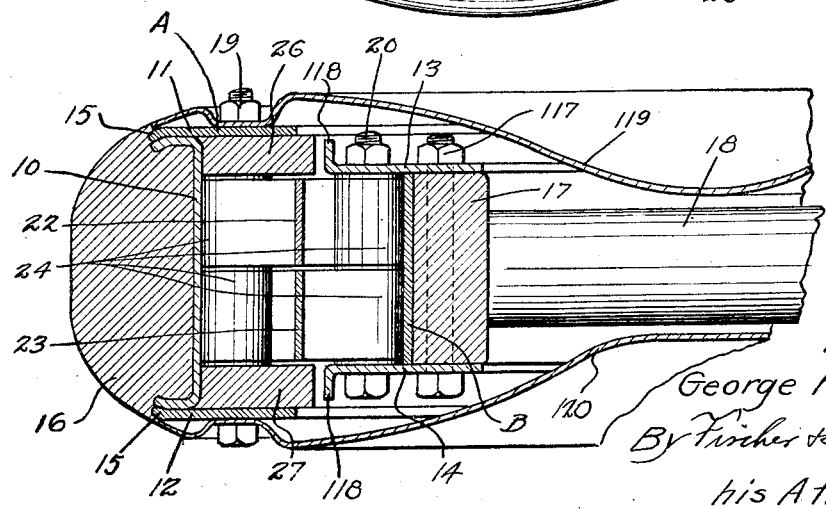
Fig. 2, is a sectional view taken on line 2—2 of Fig. 1 and drawn to a larger scale.

My invention as shown in the drawings, consists principally of a standard rim 10, preferably formed of a single piece of material rounded in the desired shape, which is adapted to receive tire 16, of the wheel 18, which tire may be a solid or pneumatic tire, as desired. This rim supports the remainder of the device which consists of two rim sections A and B, radially movable relatively to one another. These rim sections consist of ring members 11, 12, 13 and 14 which are positioned relative to one another as shown in Figure 2. The members 11 and 12 are formed with inwardly turned edges 15, adapted to engage around the curved portion of the rim 10, to hold the device in place upon the said rim. The members 13 and 14 are secured to the felly 17 by means of bolts 117, which pass through same and which serve to clamp the parts together.

The two rim sections A and B are each held together by means of a number of bolts 19 and 20, respectively which pass through the pairs of members 11 and 12 and 13 and 14 respectively, and which cause the said rim members to be clamped securely in place. The device is fastened to the felly 17, through the members 13 and 14 with the bolts 117 which secures the same firmly in place. When the parts are bolted together, a structure is provided which will not come apart without removal of said bolts 19 and 20.

The resilient members of the invention consist of two sets of curved leaf springs 22 and 23 which are formed with eyes 24, on the ends of the same, by means of which the said springs may be mounted on the bolts 19 and 20, previously referred to. As will be noted in Figure 1, each of the springs 22 and 23 is fastened at one end, to one of the bolts 20 and at the other end to one of the bolts 19, so that the two members A and B are interconnected by means of the said spring leaves. It can further be noted that the springs 23 are connected in the reverse direction to the springs 22 so that the said springs appear to cross one another.

Figure 1:
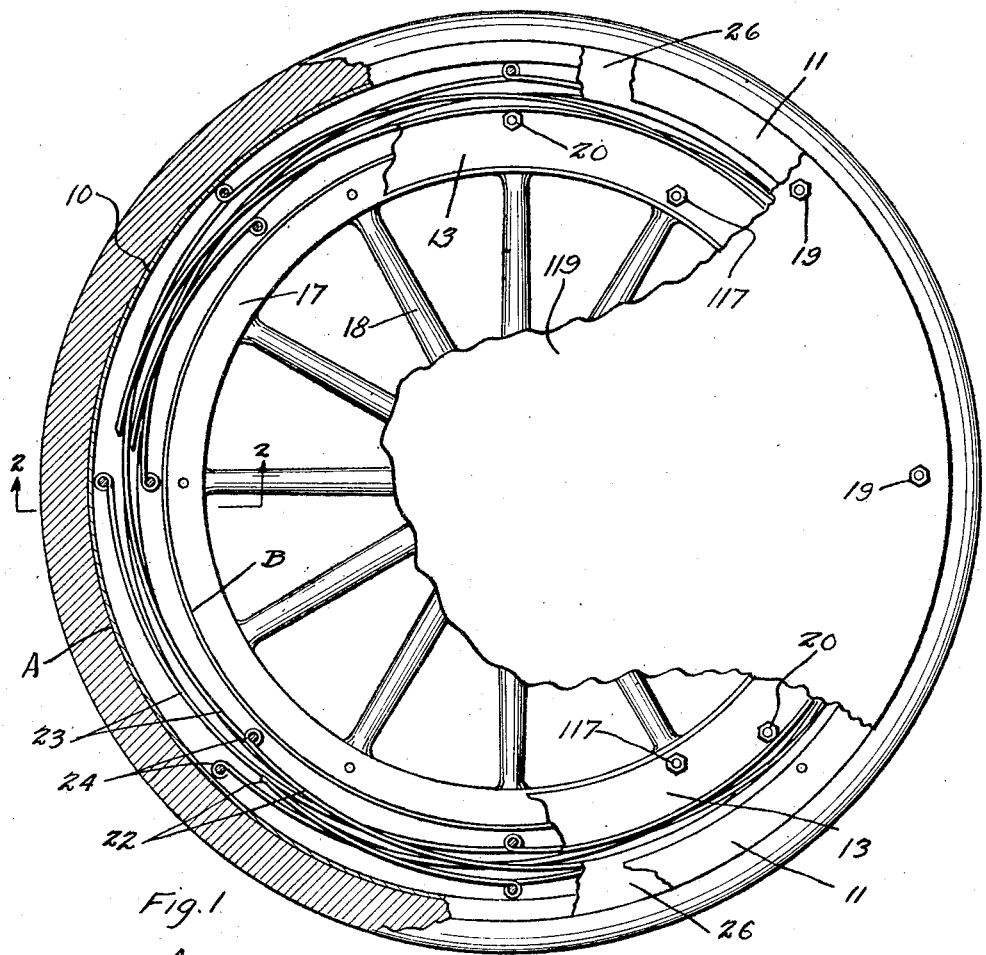
Fig. 1 is a front view of my invention, with portions cut away to show other portions within the same.

The action of the device is as follows: When the members A and B are brought toward one another at any part, all of the various spring members 22 and 23 which are shown as of curved formation in Figure 1, are caused to either straighten out or bend farther so that a resilient connection is afforded between the two portions of the rim. This has the effect of cushioning the action of the wheel by absorbing shocks directly in the rim, instead of transmitting the same through the wheel and axle of the vehicle and the body springs of the same.

For limiting the movement of the members A and B toward one another I provide a pair of annular rubber rings 26 and 27 which are positioned relative to one another as shown in Figure 2 and which are mounted between the members 11 and 12 and the springs 22 and 23 shown in detail in Figure 2. The said annular rubber rings are securely held in place within the rim structure by means of the bolts 19 which pass through the same. Each of the rubber rings 26 and 27 is adapted to abut an outwardly turned flange 118 formed on each of the ring members 13 and 14 when the rim sections A and B are brought together so as to terminate the relative movement of these sections when the springs 22 and 23 have been deflected the maximum amount. It can readily be seen that regardless of the position of the wheel when the two members A and B approach each other, the rubber rings 26 and 27 come into action, to limit the movement of the said rim members A and B to each other and to prevent shocks and jars in the event that the wheel proper encounters undue irregularities in the road over which it is travelling.

If desired two dust plates 119 and 120 may be bolted under the bolts 19, so as to keep the dust and dirt out of the operating portion of the rim proper.

When using the rim, a standard oversized wheel may be employed, on which my improved rim may be readily attached by devices already in use for that purpose. In assembling the structure, the entire device is held together by the bolts 19 and 20, permitting of all the parts within the rim to be quickly and conveniently taken apart for inspection or repairs, as required.

The advantages of my invention are manifest. The device is very simple to manufacture and consists of a minimum number of parts. The device may also be used in connection with standard wheels when desired, so that any vehicle may be equipped with my rim with a slight addition of cost. The manner of attaching the resilient members of the rim provides a structure which is exceedingly resilient and which absorbs all shocks imparted to the wheel before the same can be transmitted to the wheel proper or axle of the vehicle.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. A resilient rim comprising a pair of annular rings, a second pair of annular rings of larger diameter and spaced wider apart than said first annular rings, a pair of resilient rings lying adjacent said outer rings and extending inwardly beyond the same, springs positioned between said two sets of rings and means on said inner rings for engaging said resilient rings.

2. A resilient rim comprising a pair of annular rings, a second pair of annular rings of larger diameter and spaced wider apart than said first annular rings, bolts passing through said rings, and springs secured between the bolts on said two sets of rings, annular rubber bumpers positioned between said springs and the second rings and outwardly turned flanges, formed on said first rings adapted to be engaged thereby.

3. In combination with the felly of a wheel, a pair of annular rings bolted to the sides thereof, extending outwardly therefrom, outwardly turned flanges formed on said rings, a rim of larger diameter than said rings positioned outwardly from said rings, having a width greater than that of said rings and felly, a pair of rings positioned along the sides of said rim, annular rubber rings positioned within said rim and adjacent said rings attached thereto, the distance between said rings being of a width equal to the distance between said first named flanged rings, said flanges on said first named rings being adapted to abut said rubber rings and means positioned between said first named rings and said rubber rings for resiliently supporting said rim in relation to said felly.

4. In combination with the felly of a wheel, a pair of annular rings bolted to the sides thereof, extending outwardly therefrom, outwardly turned flanges formed on said rings, a rim of larger diameter than said rings positioned outwardly from said rings, having a width greater than that of said rings and felly, a pair of rings positioned along the side of said rim, annular rubber rings positioned within said rim and adjacent said rings attached thereto, the distance between said rings being of a width equal to the distance between said first named flanged rings, said flanges on said first named rings being adapted to abut said rubber rings, bolts passing through said first named rings between the flanges thereof and said felly bolts passing through said second named rings and through said rubber rings, inwardly beyond said rim, and spring members secured at one end to said felly bolts and at their other ends to said rim bolts.

In testimony whereof I affix my signature.

GEORGE H. YOUNG.